(12) United States Patent
Nakajima et al.

(10) Patent No.: US 6,197,211 B1
(45) Date of Patent: Mar. 6, 2001

(54) KETONE-CONTAINING WORKING FLUID FOR REFRIGERATING CYCLE EQUIPMENT AND REFRIGERATING CYCLE EQUIPMENT HAVING THE SAME

(75) Inventors: Keizo Nakajima, Kawachinagano; Tetsuji Kawakami, Katano; Takayoshi Ueno, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/294,554

(22) Filed: Apr. 20, 1999

(30) Foreign Application Priority Data

Apr. 24, 1998 (JP) .................................. 10-115040

(51) Int. Cl.$^7$ ...................................... C09K 5/04
(52) U.S. Cl. .............................. 252/68; 252/67; 508/577; 62/114
(58) Field of Search ................. 252/68, 67; 508/577; 62/114

(56) References Cited

U.S. PATENT DOCUMENTS

| | | | |
|---|---|---|---|
| 5,300,245 | * | 4/1994 | Sawada et al. ................ 252/68 |
| 5,801,132 | * | 9/1998 | Kaneko et al. ................ 508/579 |
| 6,013,609 | * | 1/2000 | Katafuchi ..................... 508/206 |

FOREIGN PATENT DOCUMENTS

| | | | |
|---|---|---|---|
| 1421753 | * | 1/1976 | (GB) . |
| 5-9480 | | 1/1993 | (JP) . |
| 06100874 | | 4/1994 | (JP) . |

* cited by examiner

*Primary Examiner*—Margaret Einsmann
(74) *Attorney, Agent, or Firm*—Akin, Gump, Strauss, Hauer & Feld, L.L.P.

(57) ABSTRACT

There is disclosed a working fluid for refrigerating cycle equipment of refrigerant compression-type containing the refrigerant and a refrigeration lubricant for a refrigerator, wherein said refrigerant comprises a hydrocarbon having 2 to 4 carbon atoms and no halogen atom and said refrigeration lubricant comprises, as a main component, a ketone compound which is incompatible with said refrigerant. This working fluid demonstrates preferable performance even if the amount of the refrigerant is small.

7 Claims, 1 Drawing Sheet

KETONE-CONTAINING WORKING FLUID FOR REFRIGERATING CYCLE EQUIPMENT AND REFRIGERATING CYCLE EQUIPMENT HAVING THE SAME

BACKGROUND OF THE INVENTION

The present invention relates to a working fluid comprising a refrigerant and a refrigeration lubricant which is used in refrigerating cycle equipment of refrigerant compression-type.

In the refrigerating cycle equipment of refrigerant compression-type such as air conditioners, electric refrigerators (freezers), refrigerating or freezing warehouses and refrigerating show cases, hydrocarbons containing a fluorine atom have conventionally been employed as refrigerant.

In particular, hydrocarbons containing a chlorine atom in addition to the fluorine atom have long been employed as the refrigerant having excellent performance such as non-flammability or the like. These chlorofluorocarbons (CFC) and hydrochlorofluorocarbons (HCFC) contain a chlorine atom. It has now been clarified that these refrigerants destruct the ozone layer when they are released to the open air and reached the stratosphere, and the use of them has recently been limited or inhibited globally.

At present, hydrofluorocarbons (HFC) containing no chlorine atom have begun to be employed in stead of these refrigerants. Although the HFC has no potential for destroying the ozone layer, it demonstrates a high greenhouse effect because its life in the air is long. Thus, the HFC is not necessarily an excellent refrigerant in the viewpoint of preventing the global warming which is a problematic concern in recent years.

Instead of the above-mentioned hydrocarbons containing a halogen atom, hydrocarbons containing no halogen atom, which are inflammable but have an ozone layer depletion potential (ODP) of zero and a very small global warming potential (GWP) as compared to the hydrocarbons containing a halogen atom, are now employed as the refrigerant. The refrigerating cycle equipment employing this refrigerant is practically used as the refrigerator and feasibility of the refrigerant for developing large-size equipment is now under investigation. In particular, iso-butane is used for the electric refrigerators and propane is used for the air conditioners as the hydrocarbon refrigerant in practical, respectively.

Further, together with the change of the refrigerant, various modifications or designs have been investigated with respect to the materials in the refrigerating cycle equipment.

For example, with respect to the refrigeration lubricant as a component of the working fluid which is employed together with the refrigerant, mineral oils and alkylbenzene compounds which were conventionally employed as the refrigeration lubricant could not be used with the recent trend for shifting the refrigerant to the ozone layer nondestructive HFC such as R-134a (1,1,1,2-tetrafluoroethane), because they have no compatibility with such refrigerant. In a refrigerating cycle of refrigerant compression-type, a portion of the refrigeration lubricant is discharged from the compressor together with the refrigerant. Therefore, the refrigeration lubricant must not be separated from the refrigerant and stayed in the refrigerating cycle (other than the compressor) in order to secure an amount of oil required for lubricating the mechanism of circulating the refrigerant through the refrigerating cycle with a low temperature part and returning the same to the compressor.

For these reasons, it has been believed that the refrigeration lubricant should have compatibility with the refrigerant.

In the refrigerating cycle equipment, which employs the HFC as the refrigerant, glycol ether oils or polyol ester, oils are mainly used as the refrigeration lubricant. In a limited number of equipment, alkylbenzene oils, which are incompatible with the HFC refrigerant are used (JP-A-5-157379).

In addition, various carbonate oils are proposed as the refrigeration lubricant for the HFC refrigerant (JP-A-3-149295, JP-A-3-247695, and others).

On the other hand, hydrocarbons containing no halogen atom such as ethane, propane, butane, iso-butane and the like are used as the refrigerant. As well as the less polar mineral oils and alkylbenezene oils which have been used with the (hydro) fluorocarbons containing a chlorine atom the much polar glycol ether oils and polyol ester oils, which have been used with the hydrofluorocarbons containing no chlorine atom, have a high compatibility with the hydrocarbon refrigerant containing no halogen atom. Therefore, it has been believed that there is no problem in selecting the refrigeration lubricant.

In the case of employing the above-mentioned refrigeration lubricants such as mineral oils, alkylbenzene oils, glycol ether oils and polyol ester oils, however, their compatibilities with the refrigerant is excessive and the amount of the refrigerant to be dissolved in the refrigeration lubricant becomes excessively large. Namely, there is a problem that a refrigerating cycle equipment could not sufficiently demonstrate its performance if a large amount of the refrigerant is charged in the equipment. On the other hand, since hydrocarbons such as ethane, propane, butane, iso-butane and the like are inflammable, it is preferable that the amount of the hydrocarbons is possibly decreased in a range wherein the refrigerating cycle equipment operates efficiently and performs its ability.

In addition, in refrigerating cycle equipment employing a HFC refrigerant together with an alkylbenzene oil which has no compatibility with the HFC, the specific gravity of the HFC refrigerant is larger than that of the refrigeration lubricant. Therefore, there is a further problem that an oiling mechanism for a sliding part of a refrigerant compressor, an oil returning mechanism for the refrigeration lubricant component circulating through the refrigerating cycle, or a driving control mechanism becomes complicated.

It is therefore the object of the present invention to provide a working fluid which demonstrates preferable performance even with the small amount of the refrigerant containing no halogen atom such as ethane, propane, butane, iso-butane or the like in the refrigerating cycle equipment.

BRIEF SUMMARY OF THE INVENTION

The present invention provides a working fluid for refrigerating cycle equipment of refrigerant compression-type which contains a refrigerant and a refrigeration lubricant for a refrigerator, wherein the above-mentioned refrigerant comprises a hydrocarbon having 2 to 4 carbon atoms and no halogen atom and the above-mentioned refrigeration lubricant for the refrigeration lubricant comprises, as a main component, a ketone compound which is incompatible with the above-mentioned refrigerant.

Further, it is preferable that the above-mentioned ketone compound is represented by the formula (1):

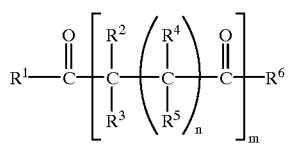

(1)

wherein $R^2$, $R^3$, $R^4$ and $R^5$ are independently a hydrogen atom, a linear or branched alkyl, alkenyl or arylalkyl group having 1 to 25 carbon atoms, or phenyl group which may be substituted by a linear or grafted alkyl or alkenyl group having 1 to 15 carbon atoms, $R^1$ and $R^6$ are independently a linear or grafted alkyl, alkenyl or arylalkyl group having 1 to 25 carbon atoms, phenyl group which may be substituted by a linear or grafted alkyl or alkenyl group having 1 to 15 carbon atoms, an n-propyl group, or an polyalkylene oxide residue, n is an integer of 1 to 19, m is an integer of 1 to 5. When each of m and n is not less than 2, each of $R^2$, $R^3$, $R^4$ and $R^5$ may not show the same substituted group in each unit.

In the above-mentioned working fluid for a refrigerating cycle equipment of refrigerant compression-type in accordance with the present invention, a saturation solubility of the above-mentioned refrigerant in the refrigeration lubricant is preferably not higher than 5 wt % at 70° C. under a vapor pressure of the refrigerant of 1.77 MPa.

In addition, a specific dielectric constant of the ketone compound represented by the aforementioned formula (1) is preferably not less than 40.

Further, it is preferable that the ketone compound represented by the formula (1) is preferably 2,5-hexanedione and the working fluid contains at least one of polyalkylene glycol compounds represented by the formula (2):

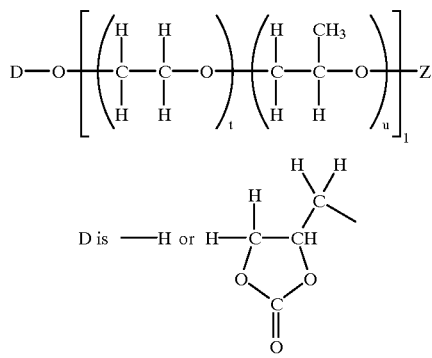

(2)

wherein Z is a hydrogen atom or a monohydric alcohol residue, and t and u are an integer of not less than 0 (wherein. t+u≧2) and 1 is an integer of 1 to 4.

In the above-mentioned working fluid for refrigerating cycle equipment of refrigerant compression-type in accordance with the present invention, the content of 2,5-hexanedione in the refrigeration lubricant is preferably 50 to 99%.

Further, it is preferable that the dynamic viscosity of the refrigeration lubricant is 0.0005 to 0.004 $m^2/S$ at 40° C.

In addition, the present invention also provides refrigerating cycle equipment, which uses the above-mentioned working fluid.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
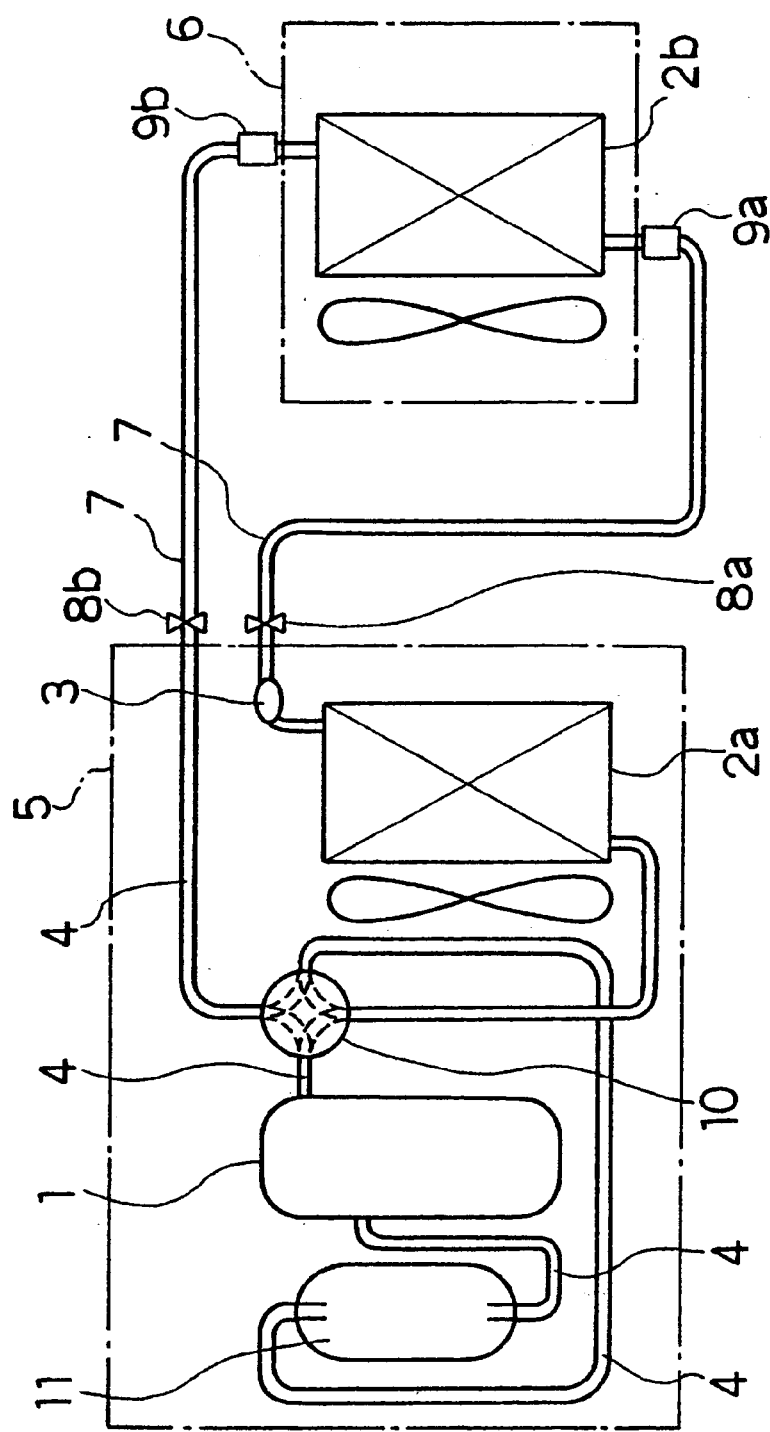
FIG. 1 is a schematic view showing an embodiment of refrigerating cycle equipment in one example of the present invention.

In the followings, the working fluid and refrigerating cycle equipment in accordance with the present invention are explained in concrete.

The working fluid of the present invention is a working fluid for a refrigerating cycle equipment of refrigerant compression-type containing the refrigerant and a refrigeration lubricant wherein the above-mentioned refrigerant comprises a hydrocarbon having 2 to 4 carbon atoms and no halogen atom and the above-mentioned refrigeration lubricant comprises, as a main component, an Ketone compound which is incompatible with the above-mentioned refrigerant.

The hydrocarbon refrigerant having 2 to 4 carbon atoms and no halogen atom of the present invention may be any hydrocarbon as far as it is non-polar in the viewpoint of incompatibility with the refrigeration lubricant as described below. As the refrigerant, there are, for example, saturated hydrocarbons such, as ethane, propane, n-butane, iso-butane and the like, unsaturated hydrocarbons such as ethylene, propene and the like. Although each of these refrigerants may be used alone, they can also be used in an admixture of two or more if the effect of the present invention is not decreased.

Among them, it is preferable to use a refrigerant comprising propane, n-butane or iso-butane, as its main component, from the viewpoint of having a boiling point suitable for operating the refrigerating cycle such as room air conditioner, refrigerator or the like.

Further, since the room air-conditioner employs a refrigerating cycle with a relatively large amount of the refrigerant circulated and reduction in the amount of the refrigerant is required, it is particularly preferable to use propane.

As these refrigerant, any commercially available products may be used.

Then, the refrigeration lubricant is explained in the followings. The refrigeration lubricant constituting the working fluid in accordance with the present invention is a refrigeration lubricant containing a ketone compound. Specifically, it designates a refrigeration lubricant containing, as its main component, a liquid substance (oil) having a chain (linear) or a cyclic ketone bond. Since the polarizability of the ketone bond is large, the polarizability of the compound having the ketone bond in the molecule becomes also large. And, it is hard to dissolve a non-polar hydrocarbon refrigerant in the compound.

The working fluid of the present invention comprises the refrigeration lubricant containing as the main component the ketone compound represented by the formula (1) and the hydrocarbon refrigerant having 2 to 4 carbon atoms and no halogen atoms.

The ketone compound represented by the formula (1) has a high polarizability and is not liable to dissolve the non-polar hydrocarbon refrigerant, if plural ketone bonds are contained.

As the typical ketone compound represented by the formula (1), there is, for example, 2,5-hexanedione (acetyl acetone). As the ketone compound having a similar structure, there is 2,4-pentanedione (acetyl acetone). When the compatibilities of these two ketone compounds to a hydrocarbon refrigerant, 2,4-pentanedione is compatible and 2,5-hexanedione is almost not compatible.

In general, it was founded that the compatibility between two substances is determined, the effect that these substances disperse and polarize, and the effect of the hydrogen bond are considered. The present inventors made attention to the polarizing effect and analyzed the most stable molecular structures of these two molecules by a quantum chemical calculating method. As the result, it was found that the polarizing effect of 2,5-hexanedione is remarkably different from that of 2,4-pentandione. This is because, in 2,5-hexanedione, the alkyl chain does not have a planar trans structure and two carbonyl groups extend from the alkyl chain in a different direction. On the contrary, in 2,4-pentanedione, the alkyl group does not have a planar trans structure but two carbonyl groups extend almost in the same direction such that the dipole moment becomes small.

The difference in the dipole moment caused by the difference in the most stabilized structure of a molecule leads to the difference in the specific dielectric constant when the compound in the bulk state is estimated, which reveals the difference in the compatibility with the hydrocarbon refrigerant. Therefore, it is preferable that the compatibility with the refrigerant is determined by the degree of the dipole moment or polarizability of a molecule. As the experimental standard, the limitation by the degree of the specific dielectric constant is further preferable as in the followings.

The ketone compound represented by the formula (1) can be prepared in the following manner. For example, the ketone compound is prepared by oxidizing a dihydric alcohol such as 2-methyl-2,5-hexanediol with chromic acid, chromium oxide, manganese dioxide, dimethyl sulfoxide, hypohalogenous acid or the like. For controlling the chain length of the ketone compound to adjust kinematic viscosity, the following reaction may be used. Namely, the ketone compound such as 2,5-hexanedione may be allowed to free radical addition react with an olefin by using an organic peroxide as an initiator, for example. Or, the ketone compound such as 2,5-hexanedione may be treated by the metallic compound such as Na, NaH, $CH_3ONa$, $C_2H_5ONa$ or the like and, then, allowed to react with an alkyl halide, for example.

As the compound represented by the formula (1), there are various kinds of compounds and the compounds are not specifically limited. In concrete, there are, for example, 3-octyl-2,5-hexanedione, 3-decyl-2,5-hexanedione, 3-isoamyl-2,5-hexanedione, 3-(2-ethylhexyl)-2,5-hexanedione, 3-(2-hexyldecyl)-2,5-hexanedione, 2,5-tetradecanedione, 2,5-hexadecanedione, 10-methyl-2,5-undecanedione, 8-ethyl-2,5-dodecanedione, 8-hexyl-2,5-hexadecanedione, 3-phenyl-2,5-hexanedione and the like.

In the present invention, it is preferable that a saturation solubility of the above-mentioned refrigerant in the refrigeration lubricant is preferably not higher than 5 wt % at 70° C. under a vapor pressure of the refrigerant of 1.77 MPa because the charging amount of the refrigerant required in the refrigerating cycle equipment can be decreased remarkably.

Further, a specific dielectric constant of the ketone compound represented by the aforementioned formula (1) is preferably not less than 40. This is because the solubility of the hydrocarbon refrigerant having 2 to 4 carbon atoms and no halogen atom into such ketone compound is lowered and the hydrocarbon refrigerant and the refrigeration lubricant become not compatible with each other in liquid phase. In concrete, the liquid phase is separated to three phases, i.e. a hydrocarbon-rich phase, a refrigeration lubricant-rich phase and an intermediate phase. By the phenomenon, the amount of the refrigeration lubricant which circulates outside of the compressor is decreased and the charging amount of the refrigeration lubricant itself can be also decreased.

In the followings, the working fluid of the present invention, which contains 2,5-hexanedione as the compound represented by the formula (1) and at least one of the polyalkylene glycol compounds represented by the formula (2), is explained.

As described above, there are many compounds as the ketone compound represented by the formula (1). The present inventors found that 2,5-hexanedione compound is less compatible with the hydrocarbon refrigerant having 2 to 4 carbon atoms and no halogen atom through the estimation experiment of the compatibility.

By adding the polyalkylene glycol represented by the formula (2) to the refrigeration lubricant, the viscosity of the refrigeration lubricant can be increased without decreasing the property of the ketone compound that the hydrocarbon is not liable to dissolve into. And, the refrigeration lubricant containing the polyalkylene glycol can be employed easily in various kinds of the refrigerating cycle equipment under different operating conditions.

This is because the polyalkylene glycol represented by the formula (2) wherein the end group is a hydroxyl group or the end group has a 1,3-dioxolan-2-en structure does not transfer into the hydrocarbon refrigerant-rich liquid phase due to the specificity of the polar end group. The polyalkylene glycol can increase the viscosity of the refrigeration lubricant comprising at least one of 2,5-alkanedione as the main component.

It is possible to add other refrigeration lubricants, additives and the like in the working fluid of the present invention in order to optimize the operating condition of the refrigerating cycle equipment if the above-mentioned properties such as incompatibility and increase in viscosity may not be inhibited remarkably.

In the above-mentioned working fluid in accordance with the present invention, the content of 2,5-hexanedione in the refrigeration lubricant is preferably 50 to 99 wt %, because incompatibility between the refrigeration lubricant and the hydrocarbon refrigerant having 2 to 4 carbon atoms and no halogen atom can be maintained.

Further, it is preferable that the dynamic viscosity of the refrigeration lubricant is 0.0005 to 0.004 $m^2/S$ at 40° C., because high efficiency in the compressor and the recycling of the refrigeration lubricant circulating in the refrigerating cycle can be achieved.

In addition, the refrigeration lubricant used in the present invention may contain, as an arbitrary component, the known lubricant oil additives such as detergent dispersant, anti-oxidant, withstand load additive, oiliness improver, pour point- depressant, acid/water trapping agent, anti-foaming agent or the like as described, for instance, in "Petroleum Product Additives" by Toshio Sakurai, published from Saiwai Shoboh, in 1964, in a range which does not deteriorate the effect of the present invention.

In addition, in the refrigerating cycle equipment of refrigerant compression-type which uses the working fluid comprising the refrigeration lubricant of the ketone compound and the hydrocarbon refrigerant having 2 to 4 carbon atoms and no halogen atom, the amount of the refrigerant required for permitting the same equipment to demonstrate the same refrigerating performance is small as compared with a conventional refrigerating cycle equipment, which uses a working fluid comprising a mineral oil or an alkylbenzene oily as the refrigeration lubricant wherein the above-mentioned hydrocarbon refrigerant dissolves in a large quantity.

In the working fluid for refrigerating cycle equipment of the refrigerant compression-type, since the specific gravity of the hydrocarbon refrigerant having 2 to 4 carbon atoms and no halogen atom is small, the refrigerant which has phase-separated in the refrigerant: compressor exists in an upper layer of the refrigeration lubricant. Therefore, the oiling to the sliding parts of the refrigerant compressor can be performed by sending a liquid component pumped up from around the inside bottom of the compressor. Further, since the dissolved amount of the refrigerant is small, it is possible to supply a liquid composition with rich refrigeration lubricant component and, thus, to drive the sliding part with a high reliability.

FIG. 1 is a schematic view of an air conditioner, one example of the refrigerating cycle equipment. As shown, an outdoor unit 5 comprises a refrigerant compressor 1, a heat-transfer unit 2a, a refrigerant flow control unit 3 such as a capillary tube or an expansion valve, and a pipeline 4 for connecting these components. The outdoor unit 5 is connected to an indoor unit 6 having a heat-transfer unit 2b installed in a part where the air-conditioning is to be performed, through a connecting pipe 7, valves 8a and 8b, and with flare connectors 9a and 9b. A four-way valve 10 is provided for switching (exchanging) the functions of the heat-transfer unit 2a and 2b directed to the condensing or evaporating of the refrigerant. In addition, an accumulator 11 may be provided.

At cooling operation, the refrigerant which has been compressed by the refrigerant compressor 1 releases its heat at the heat-transfer unit 2a and liquefies, and then becomes a gas/liquid mixed refrigerant of low temperature by passing through the refrigerant flow control unit 3. Thereafter, it absorbs heat and vaporizes at the heat-transfer unit 2b in the indoor unit 5, and thereafter, it continues to take a cycle of being sucked up again into the refrigerant compressor 1. When the flow path is switched by rotating the four-way Vale 10, a warning operation is brought, whereby the refrigerant is condensed at the heat-transfer unit 2b and evaporated at the heat-transfer unit 2a.

The refrigerating cycle equipment in accordance with the present invention is not necessarily limited to one capable of performing cooling operation and a warming operation as shown by FIG. 1, and alternatively, may be a refrigerating cycle for cooling only or Warming only incapable of exchanging the functions of the heat-transfer units by the four-way valve.

As described previously, although there is no need for peculiarly configuring the refrigerating cycle equipment to which the present invention is embodied, the equipment may preferably be provided with a device for detecting the leakage of the refrigerant.

EXAMPLE 1

Into one-liter flask having a distilling column with a cooling tube, 114 g (1,0 mol) of acetonyl acetone was added and heated to 180° C. under stream of nitrogen gas while stirring. Then, a mixture of 140.0 g (1.0 mol) of 1-decene and 14.6 g (0.1 mol) as the radical initiator was added dropwise over 6 hours and the stirring was continued for further 1 hour to obtain a reaction product. Thereafter, Oil A was obtained by distilling out under a reduced pressure of about 3 Torr at 175° C. According to IR and $^1$H-NMR, it was recognized that Oil A was an addition product of 1 mol of acetonyl acetone and 1 mol of 1-decene.

EXAMPLE 2

The distillation residue obtained in EXAMPLE 1 was continuously distilled under a reduced pressure of about 3 Torr at 175° C. to obtain Oil B. According to IR and $^1$H-NMR, it was recognized that Oil B was an addition product of 1 mol of acetonyl acetone and 2 mol of 1-decene.

EXAMPLE 3

Into one-liter flask having a distilling column with a cooling tube, 114 g (1,0 mol) of acetonyl acetone, 200 ml of acetone and 138 g (1.0 mol) of potassium carbonate were added and heated to 60° C. under stream of nitrogen gas while stirring. Then, 198.0 g (1.0 mol) of isoamyl iodide was added dropwise over 2 hours and the stirring was continued for further 35 hours to obtain a reaction product. Thereafter, Oil C was obtained by distilling out under a reduced pressure of about 25 Torr at 115° C. According to IR and $^1$H-NMR, it was recognized that Oil C was 3-isoamyl-2,5-pentanedione.

EXAMPLE 4

Into one-liter flask having a distilling column with a cooling tube, 114 g (1,0 mol) of acetonyl acetone, 200 ml of acetone and 138 g (1.0 mol) of potassium carbonate were added and heated to 60° C. under stream of nitrogen gas while stirring. Then, 127.0 g (1.0 mol) of benzyl chloride was added dropwise over 2 hours and the stirring was continued for further 35 hours to obtain a reaction product. Thereafter, Oil C was obtained by distilling out under a reduced pressure of about 10 Torr at 145° C. According to IR and $^1$H-NMR, it was recognized that Oil C was 3-phenyl-2,5-hexanedione.

EXAMPLE 5

95 Parts by weight of 2,5-hexanedione and 5 parts by weight of polyethylene glycol, which has hydroxyl groups at both ends of the molecule and a weight average molecular weight of 1000 were mixed. And, further, 0.5 parts by weight of 2,5-t-dibutyl-4-cresol as the antioxidant was admixed thereto to obtain Refrigeration Lubricant D. When the kinetic viscosity at 40° C. of Refrigeration Lubricant D was measured, the result was 20 cSt.

EXAMPLE 6

80 Parts by weight of 2,5-hexanedione and 20 parts by weight of ethylene oxide-propylene oxide copolymer, which has hydroxyl groups at both ends of the molecule and a weight average molecular weight of 600 were mixed to obtain Refrigeration Lubricant E. When the kinetic viscosity at 40° C. of Refrigeration Lubricant E was measured, the result was 38 cSt.

By mixing 0.4 g or 1.6 g of the above-obtained each ketone compound or each refrigerating lubricant and 1.6 g of propane refrigerant ware sealed in a glass tube and shaken and stirred sufficiently, and after the lapse of 10 seconds, it was observed that the phase of the working fluid was separated. The results were shown in Table 1.

Also, the specific dielectric constants and the saturation solubility of the propane refrigerant in the ketone compound or the refrigeration lubricant at 70° C. under a vapor pressure of the refrigerant of 1.77 MPa are also shown in a Table 1.

TABLE 1

| No. of Ex. | State of working fluid | Specific dielectric constant at 25° C. | Saturation solubility(wt %) |
|---|---|---|---|
| 1 | suspended | 45 | 4.0 |
| 2 | separated | 50 | 3.5 |
| 3 | separated | 45 | 3.5 |
| 4 | suspended | 40 | 4.0 |
| 5 | separated | — | 2.5 |
| 6 | separated | — | 3.0 |

EXAMPLE 7

By using 200 g of a mineral oil or Refrigeration Lubricated E obtained in EXAMPLE 5 in a single unit-type air conditioner, the performance of the air conditioner was compared examined.

In first, a standard was established by measuring the performance of the air conditioner with 200 g of the mineral oil as the refrigeration lubricant and 350 g of the refrigerant R290 (propane) sealed therein.

Then, an operation of extracting the refrigerant little by little from the refrigerating cycle was repeated on an air conditioner which contains Refrigeration Lubricant E and 350 g of the refrigerant R290 (propane), while continuing the measurement on the performance of the air conditioner.

As the result, it was found that in the case of using Refrigeration Lubricant E, performance of the same degree as that of the above standard can be attained even with about 140 g of the refrigerant R290 (propane).

According to the present invention, a working fluid which demonstrates preferable performance even with the small amount of the refrigerant containing no halogen atom such as ethane, propane, butane, iso-butane or the like in the refrigerating cycle equipment can be provided.

It is understood that various other modifications will be apparent to and can be readily made by those skilled in the art without departing from the scope and spirit of this invention. Accordingly, it is not intended that the scope of the claims appended hereto is limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A working fluid for refrigerating cycle equipment of refrigerant compression-type containing the refrigerant and a refrigeration lubricant for a refrigerator, wherein said refrigerant comprises a hydrocarbon having 2 to 4 carbon atoms and no halogen atom and said refrigeration lubricant comprises, as a main component, a ketone compound of the formula (1):

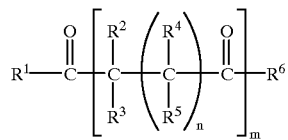

wherein $R^2$, $R^3$, $R^4$ and $R^5$ are independently a hydrogen atom, a linear or grafted alkyl, alkenyl or arylalkyl group having 1 to 25 carbon atoms, or phenyl group which may be substituted by a linear or grafted alkyl or alkenyl group having 1 to 15 carbon atoms, $R^1$ and $R^6$ are independently a linear or grafted alkyl, alkenyl or arylalkyl group having 1 to 25 carbon atoms, phenyl group which may be substituted by a linear or grafted alkyl or alkenyl group having 1 to 15 carbon atoms, an n-propyl 2 group, or a polyalkylene oxide residue, n is an integer of 1 to 19, m is an integer of 1 to 5, wherein when each of m and n is not less than 2, each of $R^2$, $R^3$, $R^4$ and $R^5$ may not show the same substituted group in each unit.

2. A refrigerating cycle equipment comprising the working fluid according to claim 1.

3. The working fluid in accordance with claim 1 wherein a saturation solubility of said refrigerant in the refrigeration lubricant is not higher than 5 wt % at 70° C. under a vapor pressure of the refrigerant of 1.77 MPa.

4. The working fluid in accordance with claim 1 wherein a specific dielectric constant of said ketone compound represented by the formula (1) is not less than 40.

5. The working fluid in accordance with claim 1 wherein said ketone compound represented by the formula (1) is 2,5-hexanedione and the working fluid contains at least one of polyalkylene glycol compounds represented by the formula (2):

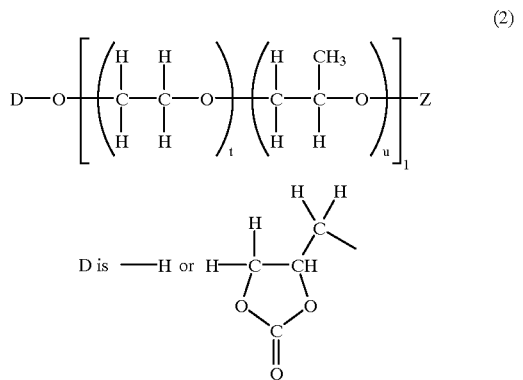

wherein Z is a hydrogen atom or a monohydric alcohol residue, and t and u are an integer of not less than 0 (wherein, t+u≧2) and l is an integer of 1 to 4.

6. The working fluid in accordance with claim 1 wherein the ketone compound is 2,5-hexanedionee and the refrigeration lubricant comprises from 50 to 99 wt % 2,5-hexanedione.

7. The working fluid in accordance with claim 1 wherein the dynamic viscosity of the refrigeration lubricant is 0.0005 to 0.004 m²/S at 40° C.

* * * * *